INVENTORS
DONALD W. CARKHUFF
THADDEUS J. WOJCIAK
HARRY C. MC GINTY
ROBERT C. DEITRICH

BY Barnwell R. King
ATTORNEY

3,261,962
METAL ARC WELDING TORCH
Donald W. Carkhuff, Jamesburg, Thaddeus J. Wojciak, Clark, Harry C. McGinty, Belleville, and Robert C. Deitrich, Maplewood, N.J., assignors to Union Carbide Corporation, a corporation of New York
Filed Nov. 24, 1964, Ser. No. 413,565
6 Claims. (Cl. 219—130)

This invention relates to metal arc welding apparatus and, more particularly, to consumable electrode gas shielded arc welding torches.

The present invention provides a gas shielded arc welding torch comprising, in combination, a nozzle, means providing a tubular shielding passage of substantially constant cross-section throughout the length thereof leading to said nozzle, a body having an annular cavity facing the gas inlet end of such passage, said body also having a relatively small high velocity gas inlet leading to such cavity, and a gas diffuser fitting in such cavity, said gas diffuser being composed of porous material, for receiving gas delivered thereto by such inlet and uniformly distributing such gas at a relatively low velocity throughout the annular gas inlet end portion of the passage, whereby the gas flows through such passage and out of the nozzle in a coherent stream.

Prior to the present invention, a gas lens to be most effective was located as near to the nozzle as possible. For consumable electrode arc welding, however, this was often objectionable because of serious spatter problems. Such problems are overcome by the present invention.

Excellent gas-shielding characteristics are achieved by causing the gas to pass through the relatively long, tubular passage in which the annular cross-sectional area is maintained substantially constant throughout the length of such passage. The gas diffuser being located at the upstream end of the tubular gas passage minimizes turbulence of incoming gases from the relatively small inlet, producing a long, highly coherent stream of shielding gas that exits from the nozzle, located at the downstream end of the passage. Preferably, the gas diffuser is located back in the gas chamber as far removed from the spatter area as is possible. Consequently, there is little need for ever replacing the gas diffuser due to spatter.

The gas diffuser functions so that even though the gas enters through the inlet from the side and at relatively high velocity, the diffuser acts to distribute the gas uniformly at a relatively low velocity to the tubular gas passage at its gas inlet end in the longitudinal direction thereof. Such double function of the gas diffuser in combination with its novel location with respect to the elongated gas passage, solves objectionable spatter problems. Spatter build-up and arc-over within the tubular gas passage are minimized by an insulating lining covering the inner wall of the passage.

Figure 1:
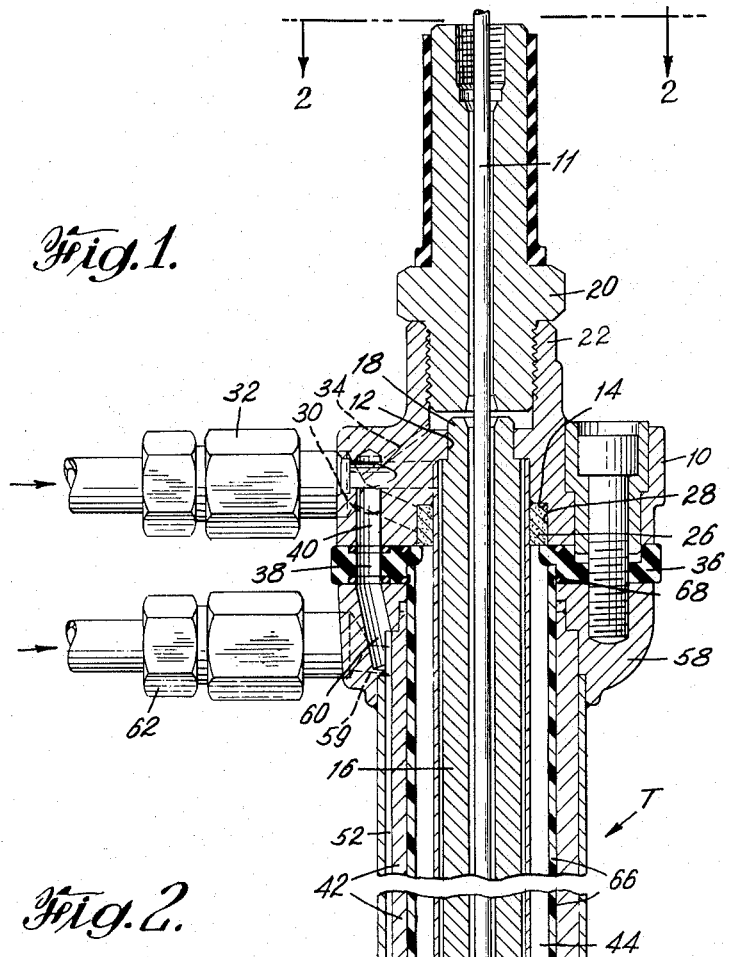
Figure 2:
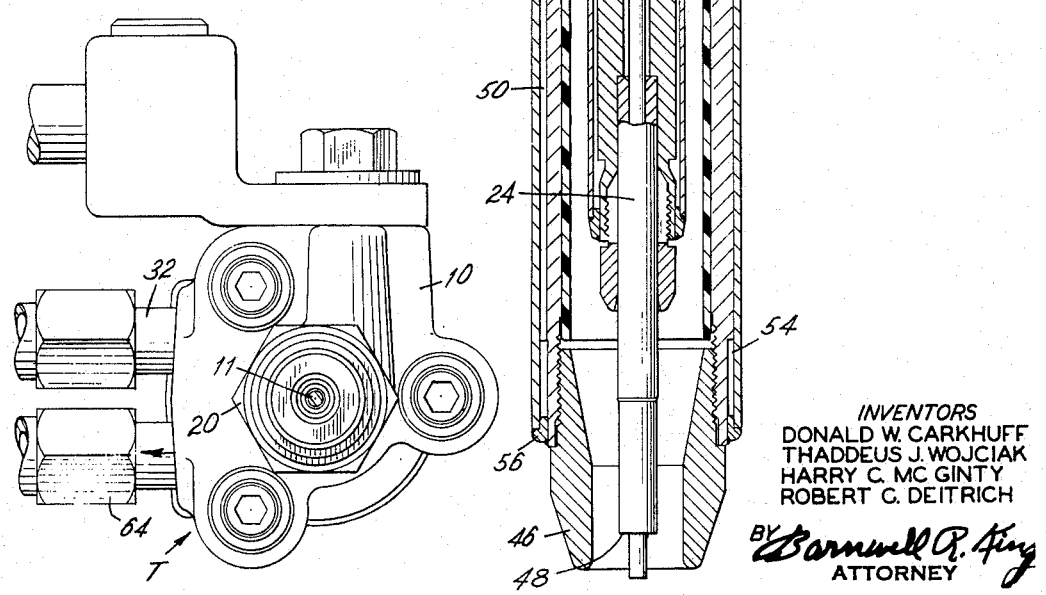

In the accompanying drawings:
FIGURE 1 is a fragmentary view mainly in vertical cross-section of a metal arc welding torch illustrating the invention; and
FIGURE 2 is a fragmentary top plan view taken on line 2—2 of FIGURE 1.

As shown in the drawing, the gas shielded arc welding torch T includes a main body 10 having a central bore 12 provided with an annular counterbored shoulder 14. The main body 10 is preferably composed of a metal, such as brass. An elongated tubular wire electrode guide 16 is provided with a rear end portion 18 that is secured to the body 10 in such counterbore 12 in mating relationship. A quick disconnect means in the front of a nipple 20 is provided for connecting the rear portion 22 of the body 10 to a suitable support (not shown) in line with suitable wire electrode feed mechanism (not shown) for feeding a consumable electrode of wire 11 through the tubular wire guide 16.

An electrode contact tube 24 is secured to the front or lower end of the guide 16 to transfer welding current to the consumable wire electrode 11 as the latter passes therethrough. An annular gas diffuser 26 is located around the guide 16 and within an enlarged counterbore 28 in the body 10 for distributing and uniformly discharging arc shielding gas therefrom. The body 10 is provided with a lateral gas inlet 30 communicating with the counterbore containing the diffuser 28, leading from a suitable gas inlet fitting 32 that is connected to the body 10. The body also has a gas bypass 34 for bleeding a relatively small amount of gas, that preferably is argon, to the inside of the guide and around the wire electrode 11, for building up a slight positive pressure of the gas therein to prevent objectionable aspiration with the wire electrode of any ambient air thereto.

An electrical insulator 36 is mounted on the front or lower face of the body 10 adjacent the annular gas exit surface of the gas diffuser 26. The gas diffuser is composed of porous material, preferably stainless steel in the form of compressed wire or powder. Fiber glass, glass wool, porous plastic, etc. are also suitable. The insulator 36 has a cooling water passage 38 mating with a corresponding passage 40 in the body 10.

A pipe 42 extends in spaced concentric relation to the guide 16 to provide an elongated annular passage 44 for the arc shielding gas extending throughout the length of such pipe. A nozzle 46 is connected with the outer or lower end of the pipe 42 adjacent the lower end 48 of contact tube 24 for discharging such arc shielding gas in a continuous stream. The pipe 42 is provided with a flute 50 separating two longitudinal channels 52 for conducting cooling water from one end to the other of the pipe, the latter being provided with a tubular outer jacket fitting the outer wall of the pipe and covering such channels 52. The latter respectively lead the water to and from an annular chamber 54 located adjacent the lower or front end of the pipe. The chamber 54 is in communication with the lower or outer ends of the channels for circulating the cooling water so as to cool the nozzle 46 that is screwed to the inner wall of the pipe, as shown.

An annular ring 56 seals the outer end of the jacket to the corresponding end of the pipe. A flange 58 connects both the pipe 42 and the jacket at the inner or upper ends thereof. Such flange is provided with one cooling water passage 59 in direct communication with the inner end of only one of such longitudinal passages 52. Another cooling water passage 60 communicates with passage 38 in insulator 36 and passage 40 in the body 10. A water inlet fitting 62 is connected to the flange 58, and a water outlet fitting 64 is connected to the body 10.

The entire inner cylindrical surface of the pipe 42 is protected from arc-over due to spatter build-up, by a liner in the shape of a tube 66 composed of glass-reinforced plastic. The tube is held in place at the upper end by a friction O ring 68. The lower end of the tube 66 is free, but in case of failure of the O ring 68, the upper rim of nozzle 46 keeps the tube from falling out.

The gas diffuser 26 acts to distribute the arc shielding gas uniformly about the inlet end of the elongated annular gas passage 44, quickly and completely filling the inlet end of such gas passage with such gas. Thus, such gas flows uniformly in a smooth stream throughout the length of the tubular longitudinal passage, as well as when the gas is discharged from the nozzle 46. This provides excellent gas shielding of the metal arc welding operations that are carried out by the torch.

What is claimed is:
1. A gas shielded arc welding torch comprising, in combination, a main body having a central bore provided with an annular counterbored shoulder, an elongated tubular wire electrode guide the rear end portion of which is secured to said body in such counterbore, an electrode contact tube secured to the front end of said guide to transfer welding current to a consumable wire electrode, an annular gas diffuser located around said guide and within a counterbore in said body for distributing and uniformly discharging arc shielding gas therefrom, said body having a lateral gas inlet passage communicating with the counterbore containing said diffuser, an electrical insulator member mounted on the front face of said body adjacent the annular gas exit surface of said diffuser, a pipe extending in spaced concentric relation to said guide for providing an elongated annular passage for the arc shielding gas, a nozzle connected to the outer end of said pipe adjacent the end of said contact tube for discharging such arc shielding gas in a continuous stream, said diffuser acting to distribute the arc shielding gas uniformly about the inlet end of the elongated annular gas passage, quickly and completely filling the inlet end of such gas passage with the gas, so that such gas flows uniformly in a coherent stream throughout the length of the longitudinal passage, as well as when the gas is discharged from the nozzle, providing excellent gas shielding of arc welding operations carried out by the torch.

2. A gas shielded arc welding torch comprising, in combination, a main body having a central bore provided with an annular counterbored shoulder, an elongated tubular wire electrode guide the rear end portion of which is secured to said body in such counterbore, an electrode contact tube secured to the front end of said guide to transfer welding current to a consumable wire electrode, an annular gas diffuser located around said guide and within a counterbore in said body for distributing and uniformly discharging arc shielding gas therefrom, said body having a lateral gas inlet passage communicating with the counterbore containing said diffuser, an electrical insulator member mounted on the front face of said body adjacent the annular gas exit surface of said diffuser, a pipe extending in spaced concentric relation to said guide for providing an elongated annular passage for the arc shielding gas, a nozzle connected to the outer end of said pipe adjacent the end of said contact tube for discharging such arc shielding gas in a continuous stream, and a plastic liner on the inner side of said pipe providing an electrical insulator throughout the length thereof.

3. A gas shielded arc welding torch comprising, in combination, a main body having a central bore provided with an annular counterbored shoulder, an elongated tubular wire electrode guide the rear end portion of which is secured to said body in such counterbore, an electrode contact tube secured to the front end of said guide to transfer welding current to a consumable wire electrode, an annular gas diffuser located around said guide and within a counterbore in said body for distributing and uniformly discharging arc shielding gas therefrom, said body having a lateral gas inlet passage communicating with the counterbore containing said diffuser, said body also having a gas bypass for bleeding a relatively small amount of gas to the inside of such guide for building up a slight positive pressure of the arc shielding gas therein to prevent objectionable aspiration with such wire electrode of ambient air thereto, an electrical insulator member mounted on the front face of said body adjacent the annular gas exit surface of said diffuser, a pipe extending in spaced concentric relation to said guide for providing an elongated annular passage for the arc shielding gas, and a nozzle connected to the outer end of said pipe adjacent the end of said contact tube for discharging such arc shielding gas in a continuous stream.

4. A gas shielded arc welding torch comprising, in combination, a main body having a central bore provided with an annular counterbored shoulder, an elongated tubular wire electrode guide the rear end portion of which is secured to said body in such counterbore, an electrode contact tube secured to the front end of said guide to transfer welding current to a consumable wire electrode, an annular gas diffuser located around said guide and within a counterbore in said body for distributing and uniformly discharging arc shielding gas therefrom, said body having a lateral gas inlet passage communicating with the counterbore containing said diffuser, an electrical insulator member mounted on the front face of said body adjacent the annular gas exit surface of said diffuser, said insulator having a cooling water passage mating with a corresponding passage in said body, a pipe extending in spaced concentric relation to said guide for providing an elongated annular passage for the arc shielding gas, a nozzle connected to the outer end of said pipe adjacent the end of said contact tube for discharging such arc shielding gas in a continuous stream, said pipe being provided with a flute separating two longitudinal channels for conducting cooling water from one end to the other of the pipe, a tubular jacket fitting said pipe and covering such channels, said pipe having an annular chamber adjacent the front end thereof in communication with the outer ends of such longitudinal channels for circulating cooling water so as to cool said nozzle, an annular ring sealing the outer end of said jacket to the corresponding end of said pipe, a flange connecting both the pipe and jacket at the inner ends thereof, having one cooling water passage in communication with the inner end of only one of such longitudinal passages, and another cooling water passage mating with the corresponding passage in the body, means attaching said flange to said body in electrically insulated relation, and a plastic liner on the inner side of said pipe providing electrical insulator throughout the length thereof, said diffuser acting to distribute the arc shielding gas uniformly about the inlet end of the elongated annular gas passage, quickly and completely filling the inlet end of such gas passage with the gas, so that such gas flows uniformly in a coherent stream throughout the length of the longitudinal passage, as well as when the gas is discharged from the nozzle, providing excellent gas shielding of arc welding operations carried out by the torch.

5. A gas shielded arc welding torch comprising, in combination, a main body having a central bore provided with an annular counterbored shoulder, an elongated tubular wire electrode guide the rear end portion of which is secured to said body in such counterbore, an electrode contact tube secured to the front end of said guide to transfer welding current to a consumable wire electrode, an annular gas diffuser located around said guide and within a counterbore in said body for distributing and uniformly discharging arc shielding gas therefrom, said body having a lateral gas inlet passage communicating with the counterbore containing said diffuser, said body also having a gas bypass for bleeding a relatively small amount of gas to the inside of such guide for building up a slight positive pressure of the arc shielding gas therein to prevent objectionable aspiration with such wire electrode of ambient air thereto, an electrical insulator member mounted on the front face of said body adjacent the annular gas exit surface of said diffuser, said insulator having a cooling water passage mating with a corresponding passage in said body, a pipe extending in spaced concentric relation to said guide for providing an elongated annular passage for the arc shielding gas, a nozzle connected to the outer end of said pipe adjacent the end of said contact tube for discharging such arc shielding gas in a continuous stream, said pipe being provided with a flute separating two longitudinal channels for conducting cooling water from one end to the other of the pipe, a tubular jacket fitting said pipe and covering such channels, said pipe having an annular chamber adjacent the front end thereof in communication with the outer ends of such longitudinal channels for circulating cooling water so as to cool said nozzle, an annular ring sealing the outer end of said jacket to the corresponding end of said pipe, a flange connecting both the pipe and jacket at the inner ends thereof, having one cooling water passage in communication with the inner end of only one of such longitudinal passages, and another cooling water passage mating with the corresponding passage in the body, means attaching said flange to said body in electrically insulated relation, and a plastic liner on the inner side of said pipe providing an electrical insulator throughout the length thereof, said diffuser acting to distribute the arc shielding gas uniformly about the inlet end of the elongated annular gas passage, quickly and completely filling the inlet end of such gas passage with the gas, so that such gas flows uniformly in a coherent stream throughout the length of the longitudinal passage, as well as when the gas is discharged from the nozzle, providing excellent gas shielding of arc welding operations carried out by the torch.

6. A gas shielded arc welding torch comprising, in combination, a nozzle, means providing a tubular shielding gas passage of substantially constant cross-section throughout the length thereof leading to said nozzle, a body having an annular cavity facing the gas inlet end of such passage, said body also having a relatively small high velocity gas inlet leading to such cavity, and a gas diffuser fitting in such cavity, said gas diffuser being composed of porous material, for receiving gas delivered thereto by such inlet and uniformly distributing such gas at a relatively low velocity throughout the annular gas inlet portion of the passage, whereby the gas flows through such passage and out of the nozzle in a coherent stream.

References Cited by the Examiner

UNITED STATES PATENTS

| 2,544,711 | 3/1951 | Mikholopov | 219—74 |
| 2,918,563 | 12/1959 | Ternisien et al. | 219—74 |
| 2,932,721 | 4/1960 | Kooistra | 219—74 |
| 3,087,045 | 4/1963 | Correy et al. | 219—74 |

References Cited by the Applicant

UNITED STATES PATENTS

| 2,504,868 | 4/1950 | Muller et al. |
| 3,053,968 | 9/1962 | Gorman. |

RICHARD M. WOOD, *Primary Examiner.*